United States Patent
Putvinski et al.

(10) Patent No.: US 6,639,222 B2
(45) Date of Patent: Oct. 28, 2003

(54) DEVICE AND METHOD FOR EXTRACTING A CONSTITUENT FROM A CHEMICAL MIXTURE

(75) Inventors: Sergei Putvinski, La Jolla, CA (US); Vadim Volosov, Novosibirsk (RU)

(73) Assignee: Archimedes Technology Group, Inc., San Diego, CA (US)

( * ) Notice: Subject to any disclaimer, the term of this patent is extended or adjusted under 35 U.S.C. 154(b) by 29 days.

(21) Appl. No.: 09/999,053

(22) Filed: Nov. 15, 2001

(65) Prior Publication Data

US 2003/0089850 A1 May 15, 2003

(51) Int. Cl.$^7$ .................. G21K 1/08; B01D 35/06; B01D 17/06
(52) U.S. Cl. .................. 250/423 R; 250/396 R; 250/281; 250/492.3; 210/695; 204/554
(58) Field of Search .................. 250/288, 291, 250/423 R, 281, 396 R, 492.3; 210/695; 204/554

(56) References Cited

U.S. PATENT DOCUMENTS

| | | |
|---|---|---|
| 3,722,677 A | 3/1973 | Lehnert |
| 4,431,901 A | 2/1984 | Hull |
| 5,039,312 A | 8/1991 | Hollis, Jr. et al. |
| 5,350,454 A | 9/1994 | Ohkawa |
| 5,560,844 A | 10/1996 | Boulos et al. |
| 5,611,947 A | 3/1997 | Vavruska |
| 5,681,434 A | 10/1997 | Eastlund |
| 6,037,587 A * | 3/2000 | Dowell et al. ............... 250/288 |
| 6,074,488 A * | 6/2000 | Roderick et al. ........... 118/728 |
| 6,096,220 A * | 8/2000 | Ohkawa ...................... 210/695 |
| 6,296,747 B1 * | 10/2001 | Tanaka .................. 204/298.07 |
| 6,375,860 B1 * | 4/2002 | Ohkawa et al. ............... 216/71 |
| 6,417,625 B1 * | 7/2002 | Brooks et al. .......... 315/111.31 |
| 6,423,191 B1 * | 7/2002 | Sorokov et al. ....... 204/192.12 |
| 6,452,199 B1 * | 9/2002 | Partlo et al. ............ 250/504 R |

* cited by examiner

Primary Examiner—John R. Lee
Assistant Examiner—Paul M. Gurzo
(74) Attorney, Agent, or Firm—Nydegger & Associates

(57) ABSTRACT

A device for separating a chemical mixture into its constituents includes a central cathode that is aligned axially within a cylindrical plasma chamber. An anode, made of the chemical mixture requiring separation is positioned near the cylindrical wall of the plasma chamber. A working gas is introduced into the chamber to sputter the chemical mixture into the plasma chamber where it is dissociated and ionized. To reduce the unwanted loss of the central cathode due to sputtering by the working gas, the central cathode is formed with a plurality of radial projections that extend outwardly from the axis of the cylindrical plasma chamber. These radial projections act to capture sputtered cathode material before it is lost to the plasma. Once the chemical mixture has been ionized in the plasma chamber, the ions are separated, according to their respective mass to charge ratio, using crossed electric and magnetic fields.

19 Claims, 2 Drawing Sheets

DEVICE AND METHOD FOR EXTRACTING A CONSTITUENT FROM A CHEMICAL MIXTURE

FIELD OF THE INVENTION

The present invention pertains generally to the extraction of a constituent from a chemical mixture. More particularly, the present invention pertains to plasma devices and methods for ionizing the constituents of a chemical mixture and separating the resulting ions according to their relative mass to charge ratio. The present invention is particularly, but not exclusively, useful for generating an ion beam containing one or more selected ions from a chemical mixture such as a metallic alloy.

BACKGROUND OF THE INVENTION

For applications wherein the purpose is to separate a constituent element from a chemical mixture such as a metallic alloy or some other mixture of elements, there are several possible ways to proceed. In some instances, mechanical separation may be possible. In others, chemical separation may be more appropriate. For cases where the chemical mixture includes alloying elements from the same chemical group (i.e. alloying elements from the same column in the periodic table), chemical separation is often difficult or impossible due to the similar chemical properties of the alloying elements. An example of a difficult to separate mixture is a metallic alloy of Zirconium (Zr) and Hafnium (Hf).

When mechanical or chemical processes are not feasible, it may happen that separation procedures and processes involving plasma physics may be necessary. Specifically, a plasma can be made from the chemical mixture and the resultant ions separated according to their respective mass to charge ratio. Ion separation can be accomplished in several ways known in the pertinent art. For example, plasma centrifuges and their methods of operation are well known. On the other hand, and not yet so well known, plasma filters and their methods of operation are also useful for this purpose. For example, the invention as disclosed by Ohkawa in U.S. Pat. No. 6,096,220 which issued on Aug. 1, 2000, for an invention entitled "Plasma Mass Filter" and assigned to the same assignee as the present invention is useful for separating ions of different mass to charge ratios.

Another example of a plasma separation process was disclosed and claimed in U.S. patent application Ser. No. 09/630,847 entitled "Mass Filtering Sputtered Ion Source" by S. Putvinski and V. Volosov, which was filed on Aug. 2, 2000 and is assigned to the same assignee as the present invention. In the '847 application, a separation process is disclosed wherein a central cathode is prepared from the mixture requiring separation. Ions from an anode that surrounds the central cathode are used to bombard the central cathode, sputtering the mixture into a plasma chamber where the mixture dissociates and ionizes. Crossed electric and magnetic fields that are established in the plasma chamber cause ions having a relatively high mass to charge ratio to fall back onto the central electrode, sustaining the sputtering of the central electrode. On the other hand, ions of relatively low mass to charge ratio respond differently to the crossed electric and magnetic fields. Specifically, these ions do not fall back onto the central electrode, but rather, they are confined inside the chamber for subsequent removal from the plasma through an exit formed in the chamber. It happens, however, that not all chemical mixtures are efficiently separated by sputtering the mixture from a central electrode.

In light of the above, it is an object of the present invention to provide devices and methods suitable for the purposes of extracting a constituent from a chemical mixture such as a metallic alloy. It is another object of the present invention to provide novel devices and methods for the separation of chemical mixtures that were previously inseparable or difficult to separate using existing separation techniques. Still another object of the present invention is to provide energy efficient methods and devices for separating chemical mixtures into their constituent elements. It is yet another object of the present invention to provide methods and devices for separating a metallic alloy into its constituent elements and creating a substantially pure ion beam containing only one of the alloying elements. Yet another object of the present invention is to provide devices and methods for separating a chemical mixture into its constituents which are easy to use, relatively simple to implement, and comparatively cost effective.

SUMMARY OF THE PREFERRED EMBODIMENTS

The present invention is directed to devices and methods for separating a chemical mixture into its constituents. In overview, the present invention includes a central cathode that is aligned axially within a cylindrical plasma chamber. An anode, made of the chemical mixture requiring separation is positioned near the cylindrical wall of the plasma chamber. A working gas, which is preferably a noble gas, is introduced into the chamber near the cylindrical wall to sputter the chemical mixture (i.e. the anode) into the plasma chamber where it is dissociated and ionized. To reduce the unwanted loss of the central cathode due to sputtering by the working gas, the central cathode is formed with a plurality of radial projections that extend outwardly from the axis of the cylindrical plasma chamber. The functional effect of these radial projections is to capture sputtered cathode material before it is lost to the plasma. On the other hand, once the chemical mixture has been sputtered from the anode and ionized in the plasma chamber, its ions are separated, according to their respective mass to charge ratio, using crossed electric and magnetic fields.

In greater detail, the device of the present invention includes a cylindrical plasma chamber that is open at one end, closed at the other end and defines a longitudinal axis. The plasma chamber has a cylindrical wall that is formed with a plurality of holes to allow the working gas to be introduced into the chamber. Inside the plasma chamber, an elongated central cathode is positioned and oriented substantially along the longitudinal axis. Preferably, the central cathode is hollow to accommodate recycling of the working gas that accumulates at the central cathode. For this purpose, one or more channels are formed in the central cathode to allow working gas in the plasma chamber to enter the hollow central cathode. From the hollow central cathode, the working gas is routed outside the plasma chamber for subsequent reintroduction into the plasma chamber through the holes in the cylindrical wall.

In accordance with the present invention, crossed electric and magnetic fields are established in the plasma chamber. These fields are used to cause the working gas to sputter the chemical mixture (i.e. the anode), and to separate the resulting ions according to their respective mass to charge ratio. To generate the required magnetic field in the chamber, coils are mounted on the outside of the cylindrical wall. With this cooperation of structure, a magnetic field that is oriented parallel to the longitudinal axis is created. The coils are preferably configured to create a magnetic field having a substantially uniform field strength throughout the chamber.

In accordance with the present invention, a radially oriented electric field is established in the plasma chamber. To create the electric field, ring electrodes are positioned in the plasma chamber near the closed end of the cylindrical wall. In some embodiments, a voltage source can be connected directly to the wall and the central cathode to establish part or all of the required electric field. Importantly, the radially oriented electric field is directed inwardly from the wall towards the central cathode.

To separate the chemical mixture into its constituents, the chemical mixture is positioned in the plasma chamber near the cylindrical wall. To accomplish this, the chemical mixture can be formed as one or more tiles that are mounted on the inside surface of the wall, facing the central cathode. Alternatively, the wall itself can be made of the chemical mixture. In either case, the chemical mixture is electrically connected to the voltage source to effectively become an anode relative to the central cathode.

In the operation of the present invention, the chemical mixture requiring separation is first identified. Generally, the chemical mixture will contain two constituents for separation, with one constituent having a relatively low mass to charge ratio in the plasma and the other constituent having a relatively high mass to charge ratio in the plasma. Next, the working gas is selected. For the present invention, the working gas is preferably selected to have a mass to charge ratio in the plasma that is between the mass to charge ratios of the two constituents of the chemical mixture.

Once selected, the working gas is introduced into the chamber through the holes that are provided in the cylindrical wall. With the plasma chamber filled with working gas, the ring electrodes are energized to establish a radial electric field in the chamber that is sufficient to create a plasma from the working gas. Once a plasma has been initiated in the chamber, the strengths of the electric and magnetic fields can be adjusted to effect the sputtering of the anode by the working gas and the separation of the resulting ions according to their respective mass to charge ratio. Specifically, under the influence of the electric and magnetic fields, molecules of the working gas are ionized near the cylindrical wall and directed on trajectories towards the central cathode. Near the central cathode, the ions of the working gas undergo electron exchange reactions with neutral atoms that are present there, creating fast neutrals that are directed towards the anode. Importantly, the fast neutrals are produced with sufficient energy to strike the anode and thereby sputter the chemical mixture into the plasma.

In the plasma, the sputtered chemical mixture is dissociated into its constituents, and the constituents are ionized. Due to the strengths and orientations of the electric and magnetic fields in the chamber, ionized constituents having a relatively high mass to charge ratio are placed on trajectories that are directed towards the central cathode (i.e. orbital trajectories of large radius). Upon striking the central cathode, these ions are captured. On the other hand, ions having a relatively low mass to charge ratio are placed on small radius, orbital trajectories. As such, these ions are directed out of the plasma chamber through the open end. The result is an essentially pure ion beam exiting from the device that contains only the ions of relatively low mass to charge ratio.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
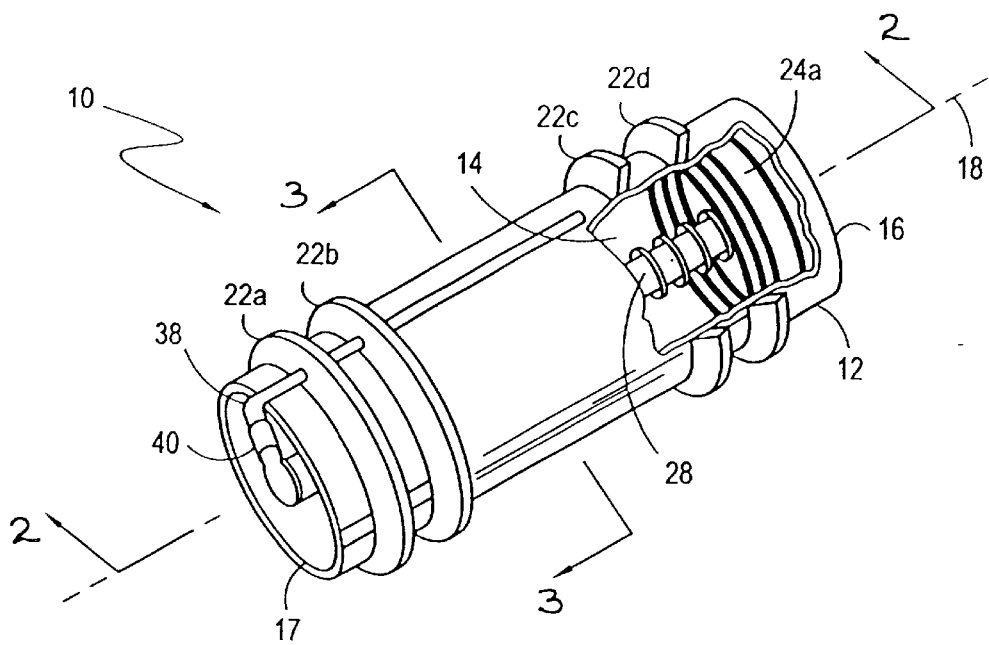
FIG. 1 is a perspective view of a separation device in accordance with the present invention.
Figure 2:
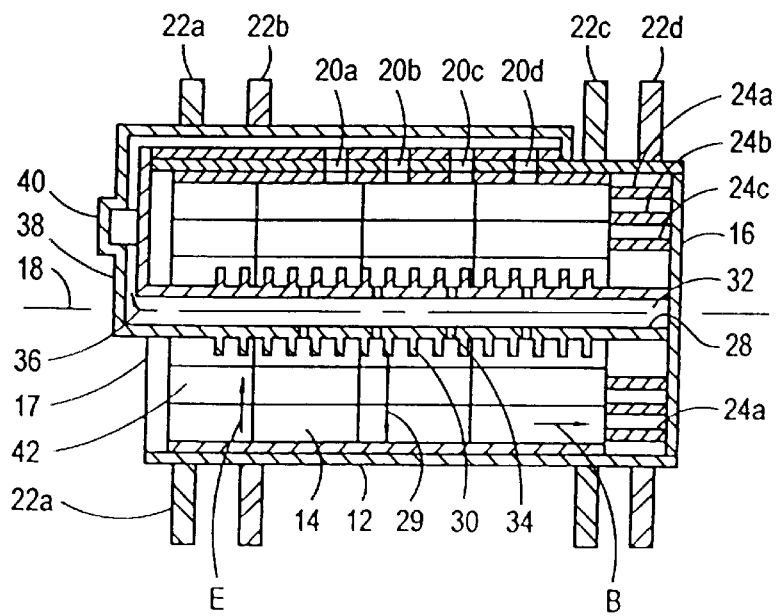
FIG. 2 is a cross sectional view of the separation device as seen along the line 2—2 in FIG. 1.

Referring initially to FIG. 1, a separation device in accordance with the present invention is shown and generally designated 10. As shown, the separation device 10 includes a substantially cylindrical wall 12 that surrounds a chamber 14 and extends from a closed end 16 to an open end 17. As shown in FIG. 2, the cylindrical wall 12 defines a longitudinal axis 18. In the preferred embodiment of the present invention, the wall 12 is formed with a plurality of holes 20*a–d* to allow a working gas to be introduced into the chamber 14. Although four holes 20*a–d* are shown, it is to be appreciated that the size, shape and number of holes 20*a–d* shown for introducing a working gas into the chamber 14 is merely exemplary.

Referring now with cross reference to FIGS. 1 and 2, it can be seen that coils 22*a–d* are mounted on the outside of the wall 12. For the present invention, a current source (not shown) can be used to pass an electrical current through the coils 22*a–d* to generate a magnetic field, B, in the chamber 14. For the present invention, a magnetic field that is oriented substantially parallel to the longitudinal axis 18, and is substantially uniform in strength throughout the chamber 14 is preferably established. For some applications, small magnetic mirrors (not shown) can be established near the ends 16, 17 of the wall 12 to axially confine the plasma within the chamber 14. Although four coils 22*a–d* are shown mounted on the outside of the wall 12 to generate a uniform magnetic field in the chamber 14, it is to be appreciated that these coils 22*a–d* are merely exemplary, and that the size, shape and number of coils 22*a–d* can be varied in accordance with the present invention. Furthermore, it is to be appreciated that other methods known in the pertinent art for establishing a uniform, axially aligned magnetic field in the chamber 14 can be used for the present invention.

In accordance with the present invention, as shown in FIGS. 1 and 2, a plurality of ring electrodes 24*a–c*, are positioned in the chamber 14 near the closed end 16 of the wall 12. As shown, each ring electrode 24*a–c* is preferably positioned to be concentrically centered on the longitudinal axis 18. For the present invention, the ring electrodes 24*a–c* can be staggered axially to reduce sputtering of the electrodes 24*a–c* by the ion beam exiting the chamber 14 (note: axially staggered electrodes not shown). With this combination of structure, a voltage source (not shown) can be connected to the electrodes 24*a–c* to establish a radially oriented electric field, E, in the chamber 14.

Referring still to FIG. 2, it can be seen that an elongated central electrode 28 is positioned in the chamber 14 and oriented substantially along the longitudinal axis 18. Preferably, as shown, the outer surface of the central electrode 28 is formed with a plurality of disk-shaped projections 30 that extend radially outward from the longitudinal axis 18. In accordance with the present invention, the projections 30 are provided to minimize loss of the central electrode 28 to the plasma in the chamber 14 due to sputtering of the central electrode 28. Although disk-shaped projections 30 are shown, it is to be appreciated that any surface feature known in the pertinent art, such as a beehive configuration (not shown), that effectively minimizes sputter loss can be used on the surface of the central electrode 28 in conjunction with the present invention.

In some embodiments, a voltage source (not shown) can be connected to apply a voltage between the wall 12 and the central electrode 28 to establish part or all of the required radially oriented electric field in the chamber 14. Thus, a radially oriented electric field is established by either the ring electrodes 24a–c, the wall 12 and central electrode 28, or both. Importantly, the radially oriented electric field is directed inwardly from the wall 12 towards the central electrode 28, and accordingly, the central electrode 28 functions as a cathode while the wall 12 functions as an anode. As shown, the central electrode 28 is distanced from the wall 12 by a distance 29.

As further shown in FIG. 2, the central electrode 28 is preferably formed with a gas-box 32 for the purpose of recycling working gas that has accumulated at the central electrode 28. As shown, channels 34 are formed in the central electrode 28 to allow working gas to pass into the gas-box 32 from the chamber 14. Once inside the gas-box 32, the working gas is able to travel in the direction of arrow 36 and into a duct 38 that is located outside of the wall 12. In the preferred embodiment of the present invention, the duct 38 is routed along the outside of the wall 12 to deliver working gas from the gas-box 32 to the holes 20a–d in the wall 12 for subsequent reintroduction into the chamber 14. Also shown, a control valve 40 is preferably installed along the duct 38 to selectively meter the working gas through the duct 38. Although only one duct 38 is shown to deliver working gas from the gas-box 32 to the holes 20a–d, it is to be appreciated that any number of ducts 38 can be provided to deliver working gas from the gas-box 32 to the holes 20a–d.

Figure 3:
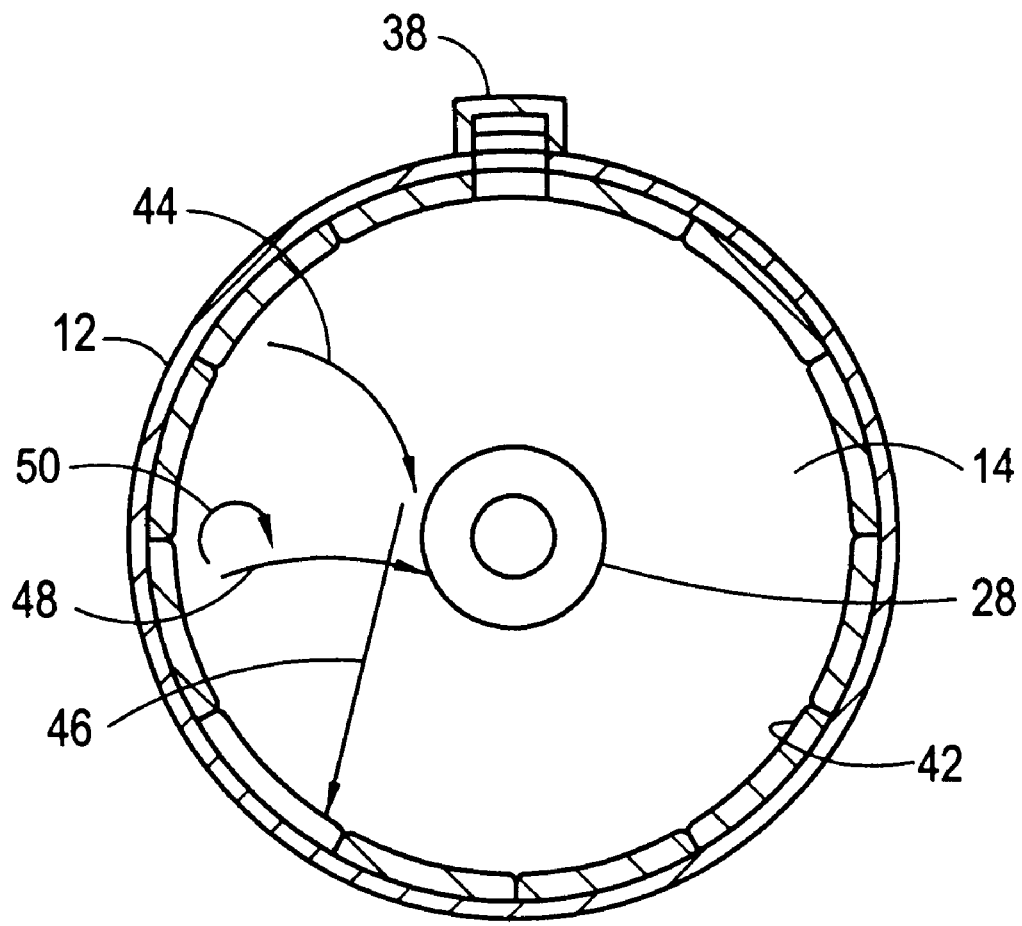
FIG. 3 is a cross sectional view of the separation device as seen along the line 3—3 in FIG. 1 with portions removed for clarity.

In the preferred embodiment of the present invention, the chemical mixture requiring separation is formed into tiles 42 and mounted on the inside of the wall 12 facing the chamber 14, as shown in FIGS. 2 and 3. In an alternative embodiment of the present invention (not shown), the wall 12 can be made of the chemical mixture requiring separation. In accordance with the present invention, the chemical mixture can be a mixture, aggregate or alloy of two or more constituents. Each constituent, in turn, can be a chemical element, isotope or chemical compound. One chemical mixture that is particularly applicable for the present invention is a metallic alloy of Zirconium and Hafnium.

The operation of the present invention can best be appreciated with reference to FIGS. 2 and 3. Once the constituents of the chemical mixture are known, the working gas can be selected. Specifically, the chemical mixture will be separated into constituent(s) having relatively low mass to charge ratios in the plasma and constituent(s) having relatively high mass to charge ratios in the plasma. Preferably, the working gas is selected to have a mass to charge ratio in the plasma that is between the low mass to charge ratio constituent and the high mass to charge ratio constituent. Further, a noble element is preferably used as the working gas. For the case where the chemical mixture requiring separation is a metallic alloy of Zirconium and Hafnium, the working gas is preferably Xenon.

To create a plasma in the chamber 14, the chamber 14 is first evacuated and then filled with the working gas using the holes 20a–d in the wall 12. Next, a plasma is created from the working gas in the chamber 14 by energizing the ring electrodes 24a–c. Upon obtaining a plasma in the chamber 14, the strengths of the electric and magnetic fields are adjusted to control the trajectories of the ions to effect separation of the chemical mixture. In one embodiment, the electric and magnetic fields are adjusted to cause the Larmor diameter of the working gas to be slightly smaller than the distance 29 between the central electrode 28 and the anode (i.e. the tiles 42). Generally, a relatively large electric field is required to initially create a plasma from the working gas and a smaller electric field necessary to establish the proper ion trajectories. Once the strengths of the electric and magnetic fields have been properly adjusted, molecules/atoms of the working gas that are ionized near the wall 12 are directed on trajectories (shown by exemplary arrow 44) toward the central electrode 28. Specifically, the strengths of the magnetic and electric fields are established such that the Larmor diameter of the working gas ions in the fields is somewhat smaller than the distance 29 between the wall 12 and the central electrode 28. Near the central electrode 28, a portion of the working gas ions that were directed toward the central electrode 28 (i.e. arrow 44) will undergo electron exchange reactions with neutrals atoms that are present there, creating fast neutrals that are directed on trajectories (shown by exemplary arrow 46) towards the tiles 42. Another portion of the working gas ions that were directed toward the central electrode 28 (i.e. arrow 44) will strike the central electrode 28, neutralize, and contribute to the neutral gas pressure in the gas-box 32. It is to be appreciated that the fast neutrals that are produced have sufficient energy to strike the chemical mixture near the wall 12 and sputter the chemical mixture into the chamber 14 where a plasma has been established from the working gas.

In the plasma, the sputtered chemical mixture is dissociated into its constituents, and the constituents are ionized. Due to the strengths and orientations of the electric and magnetic fields in the chamber 14, ionized constituents having a relatively high mass to charge ratio are placed on trajectories that are directed towards the central electrode 28 (i.e. orbital trajectories of large radius, shown by exemplary arrow 48). Specifically, the strengths of the magnetic and electric fields are established such that the Larmor diameter of the high mass to charge ratio ions in the fields is larger than the distance 29 between the wall 12 and the central electrode 28. Upon striking the central electrode 28, these ions are captured. On the other hand, ions having a relatively low mass to charge ratio are placed on small radius, orbital trajectories (shown by exemplary arrow 50). Specifically, the strengths of the magnetic and electric fields are established such that the Larmor diameter of the small mass to charge ratio ions in the crossed electric and magnetic fields is smaller than the diameter of the chamber 14. As such, these ions are directed out of the chamber 14 through the open end 17. The result is an essentially pure ion beam containing almost exclusively ions of relatively low mass to charge ratio exiting from the open end 17 of the wall 12.

During the operation of the present invention, neutrals of the working gas are accumulated near the central electrode 28 and depleted near the wall 12. Denoting the direct ion current to the cathode as I and the charge exchange flux as $\Gamma_0$, energetic ions that reach the cathode due to direct loss (particle flow I/e) and energetic neutrals that are produced due to charge exchange of these ions with neutral gas near the cathode ($\frac{1}{2}\Gamma_0$) both sputter the cathode and create a flow of neutrals from the cathode, $n_{0c}V_0$. Here $n_{0c}$ is neutral density of the sputtered atoms near the cathode and $V_0$ is average velocity of the sputtered ions. It is further assumed that about one-half (½) of the charge exchange neutrals can reach the cathode and about one-half (½) can reach the anode. The dependence of this partition on attenuation of the beam has been neglected. The ratio β can be defined as:

$$\text{Ratio } \beta = \Gamma_0/(I/e).$$

The flux of fast neutrals that end up on the cathode, are neutralized, and contribute to the pressure in the gas-box 32, can be expressed as a function of ion current:

$$G_c = (I/e)(1+\beta/2).$$

The flux of fast neutrals in the direction of the anode is:

$$G_a = (I/e)\beta/2$$

which is smaller than the gas flow from the anode:

$$n_{0a} \langle V_0 \rangle S = (I/e)(1+\beta).$$

Here $n_{0a}$ is the neutral density of the sputtered atoms near the anode. Accordingly, to sustain the discharge, a bypass for the gas flow can be provided. Assuming Knudsen flow in the bypass duct 38:

$$G_a = S_{duct}(D/L) \langle V0 \rangle (n_{0c} - n_{0a}).$$

Here $S = \pi D^2/4$, D is duct 38 diameter and L is duct 38 length. As indicated above, the gas conductance in the duct 38 can be controlled by a valve, and, hence, the ratio $n_{0a}/n_{0c}$ can be varied if necessary.

Table 1 below provides exemplary parameters for a small-scale device to separate a Zirconium-Hafnium alloy.

|  | Reference | Dimensions |
|---|---|---|
| Radius (anode) | 0.20 | m |
| Outer radius (cathode) | 0.10 | m |
| Length of the plasma | 0.20 | m |
| Magnetic field | 0.50 | T |
| Heavy ion atomic mass, Hf | 178 | |
| Light ion atomic mass, Zr | 91 | |
| Gas ion atomic mass, Xe | 131 | |
| Voltage | 730 | V |
| Normalized Larmor diameter | | |
| Hf | 1.1 | |
| Zr | 0.56 | |
| Xe | 0.80 | |
| Electron temperature | 9.25 | eV |
| Plasma density (near the walls) | 7.00E + 18 | 1/m$^3$ |
| Plasma current | 190 | A |
| Metal ion current | 50 | A |
| DC power | 83 | kW |
| Neutral density near anode | 7.6E + 18 | 1/m$^3$ |
| Neutral density near cathode | 1.4E + 20 | 1/m$^3$ |
| Sputtering yield | 0.53 | |
| Energy cost of metal ion | 1700 | eV |

While the particular methods and devices as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A device for ionizing and separating the constituents of a chemical mixture into ions having a relatively low mass to charge ratio ($M_1$) and ions having a relatively high mass to charge ratio ($M_2$), said device comprising:
   a wall surrounding an elongated chamber, said wall defining a longitudinal axis and having a first end and a second end, wherein said first end is formed with an opening and the chemical mixture is mounted on said wall for exposure to said chamber;
   a central electrode positioned in said chamber and oriented substantially along said longitudinal axis;
   a means for introducing a working gas into said chamber for ionization, said working gas having a mass to charge ratio ($M_w$) in said chamber between $M_1$ and $M_2$ ($M_1 < M_w < M_2$);
   a means for generating an axially oriented magnetic field in said chamber; and
   a means for generating a radially oriented electric field crossed with said magnetic field and configured to cause said working gas to sputter and ionize the chemical mixture and to confine said low mass ions ($M_1$) for exit from said chamber though said first end and to direct said high mass ions ($M_2$) into said central electrode for capture thereon.

2. A device as recited in claim 1 wherein said means for generating a radially oriented electric field in said chamber comprises a voltage source connected to said wall and to said central electrode to establish a voltage difference therebetween.

3. A device as recited in claim 1 wherein said means for generating a radially oriented electric field in said chamber comprises a plurality of ring electrodes positioned in said chamber near one of said ends of said wall.

4. A device as recited in claim 1 wherein said means for generating a radially oriented electric field in said chamber comprises a voltage source connected to said wall and to said central electrode to establish a voltage difference therebetween, and a plurality of ring electrodes positioned in said chamber near one of said ends of said wall.

5. A device as recited in claim 1 wherein said means for introducing a working gas into said chamber comprises at least one hole formed in said wall.

6. A device as recited in claim 5 wherein said central electrode is formed with a gas-box for accumulation of said working gas and a means for transferring said working gas from said gas-box, outside said wall and then through said hole in said wall to reintroduce said working gas into said chamber.

7. A device as recited in claim 6 wherein said transferring means comprises a duct and said device further comprises a control valve for selectively metering said working gas through said duct.

8. A device as recited in claim 1 wherein said central electrode is formed with an outer surface facing said chamber and said outer surface is textured to minimize the loss of central electrode material from sputtering of the central electrode.

9. A device as recited in claim 1 wherein said central electrode is formed with an outer surface facing said chamber and said outer surface is formed with projections extending radially therefrom to minimize the loss of central electrode material from sputtering of the central electrode.

10. A device as recited in claim 9 wherein said projections are substantially disk shaped.

11. A device as recited in claim 1 wherein tiles are formed of said chemical mixture and said tiles are mounted on said wall.

12. A device as recited in claim 1 wherein said wall is made of said chemical mixture.

13. A device for sputtering and ionizing a chemical mixture and separating ions of said chemical mixture according to their mass to charge ratio, said device comprising:

a wall surrounding a volume and formed with an opening, wherein said chemical mixture is mounted on said wall for exposure to said volume;

a central electrode positioned in said volume and distanced from said wall;

a means for introducing a working gas into said volume;

a means for generating a magnetic field in said volume; and a means for generating an electric field in said volume directed inwardly from said wall to said central electrode, said magnetic and electric fields being configured to cause a portion of said working gas to become fast neutrals that are directed towards the chemical mixture to sputter the chemical mixture into said volume for ionization into ions in said electric and magnetic fields, said electric and magnetic fields being configured to place ions having a mass to charge ratio less than a predetermined mass to charge ratio on trajectories for exit from said volume through said opening, and to place ions having a mass to charge ratio greater than said predetermined mass to charge ratio on trajectories into said central electrode for capture thereon.

14. A device as recited in claim 13 wherein said means for introducing a working gas into said volume comprises at least one hole formed in said wall and wherein said central electrode is formed with a gas-box for accumulation of said working gas and a means for transferring said working gas from said gas-box, outside said wall, and then back into said volume through said hole in said wall.

15. A device as recited in claim 13 wherein said central electrode is formed with an outer surface facing said volume and said outer surface is formed with projections extending from said central electrode to minimize the loss of central electrode material from sputtering of the central electrode.

16. A method for separating a chemical mixture into constituents, said method comprising:

providing a wall that surrounds an elongated chamber, with said chemical mixture mounted on said wall for exposure to said chamber, said wall defining a longitudinal axis and having a first end and a second end, said first end formed with an opening;

generating an axially oriented magnetic field in said chamber;

generating a radially oriented electric field in said chamber;

aligning a central electrode along said axis in said chamber; and introducing a working gas into said chamber for interaction with said magnetic and electric fields to sputter said chemical mixture, for subsequent ionization of said chemical mixture to ions in said chamber, said electric and magnetic fields configured to confine ions having a mass to charge ratio below a predetermined mass to charge ratio for exit from said chamber through said first end and to direct ions having a mass to charge ratio above said predetermined mass to charge ratio into said central electrode for capture thereon.

17. A method as recited in claim 16 wherein said working gas comprises the gas of a noble element.

18. A method as recited in claim 16 wherein said chemical mixture comprises an alloy of Zirconium and Hafnium.

19. A method as recited in claim 18 wherein said working gas comprises Xenon.

* * * * *